Aug. 6, 1935.  W. CONWAY  2,010,508
MEANS FOR SORTING REFUSE
Filed Nov. 29, 1933  3 Sheets-Sheet 1

INVENTOR
William Conway
BY
ATTORNEYS

Aug. 6, 1935. W. CONWAY 2,010,508
MEANS FOR SORTING REFUSE
Filed Nov. 29, 1933 3 Sheets-Sheet 2

INVENTOR
William Conway
BY
ATTORNEYS

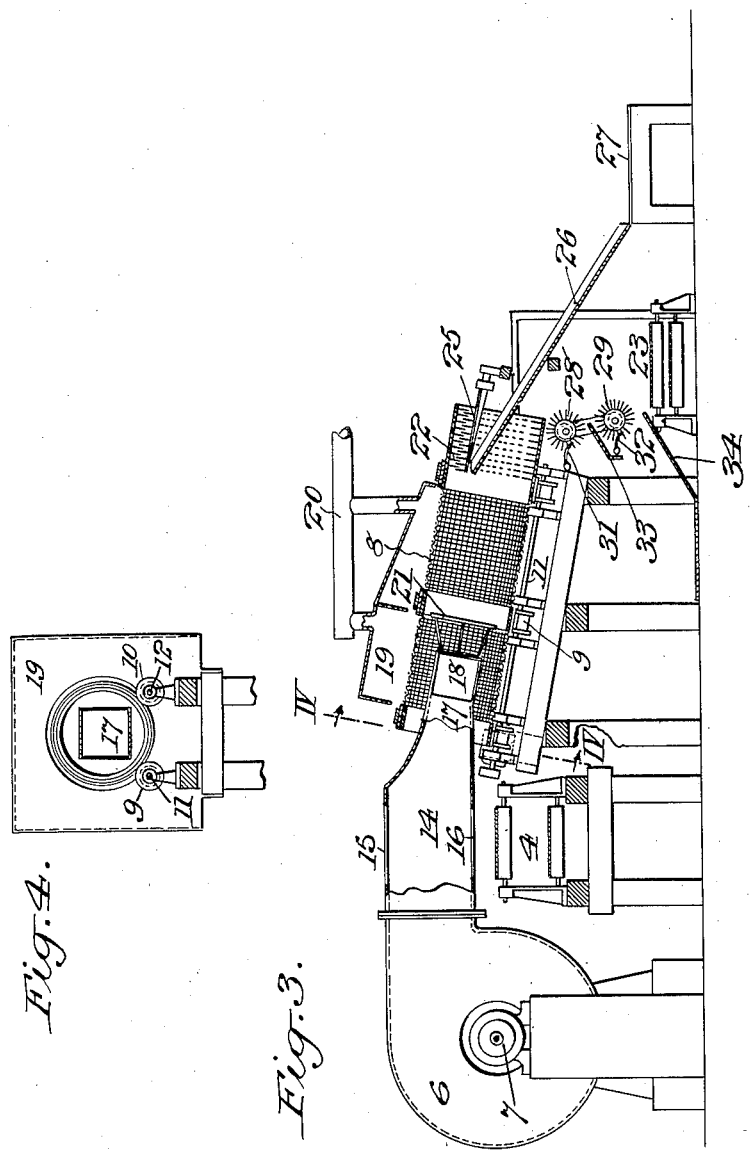

Patented Aug. 6, 1935

2,010,508

UNITED STATES PATENT OFFICE 2,010,508

MEANS FOR SORTING REFUSE

William Conway, Hollis, N. Y.

Application November 29, 1933, Serial No. 700,195

6 Claims. (Cl. 209—22)

My invention includes the method of and means for materially simplifying the work of refuse sorting by causing the refuse to fall by gravity and while thus falling, blowing the lighter materials away from the heavier materials into a device where the lighter materials may be separated and removed; means being provided for removing the dust from the said lighter materials.

My invention more particularly includes an endless conveyor arranged to receive the garbage from a supply source and carry the garbage to a point where it will fall off from the delivery end of the said endless conveyor on to the receiving end of a second endless conveyor, a blower being provided in position to blow the lighter materials from the falling refuse into a rotary sieve where the dust is removed from the lighter materials and the lighter materials are separated into groups of different materials or different grades of the same material.

The apparatus which I have devised for carrying out my improved method is represented in the accompanying drawings in which Fig. 1 represents a top plan view of the apparatus;

Fig. 3 represents a vertical transverse section taken in the plane of the line III—III of Fig. 1, looking in the direction of the arrows; and Fig. 4 represents a detail cross section taken in the plane of the line IV—IV of Fig. 3, looking in the direction of the arrows.

Figure 1:
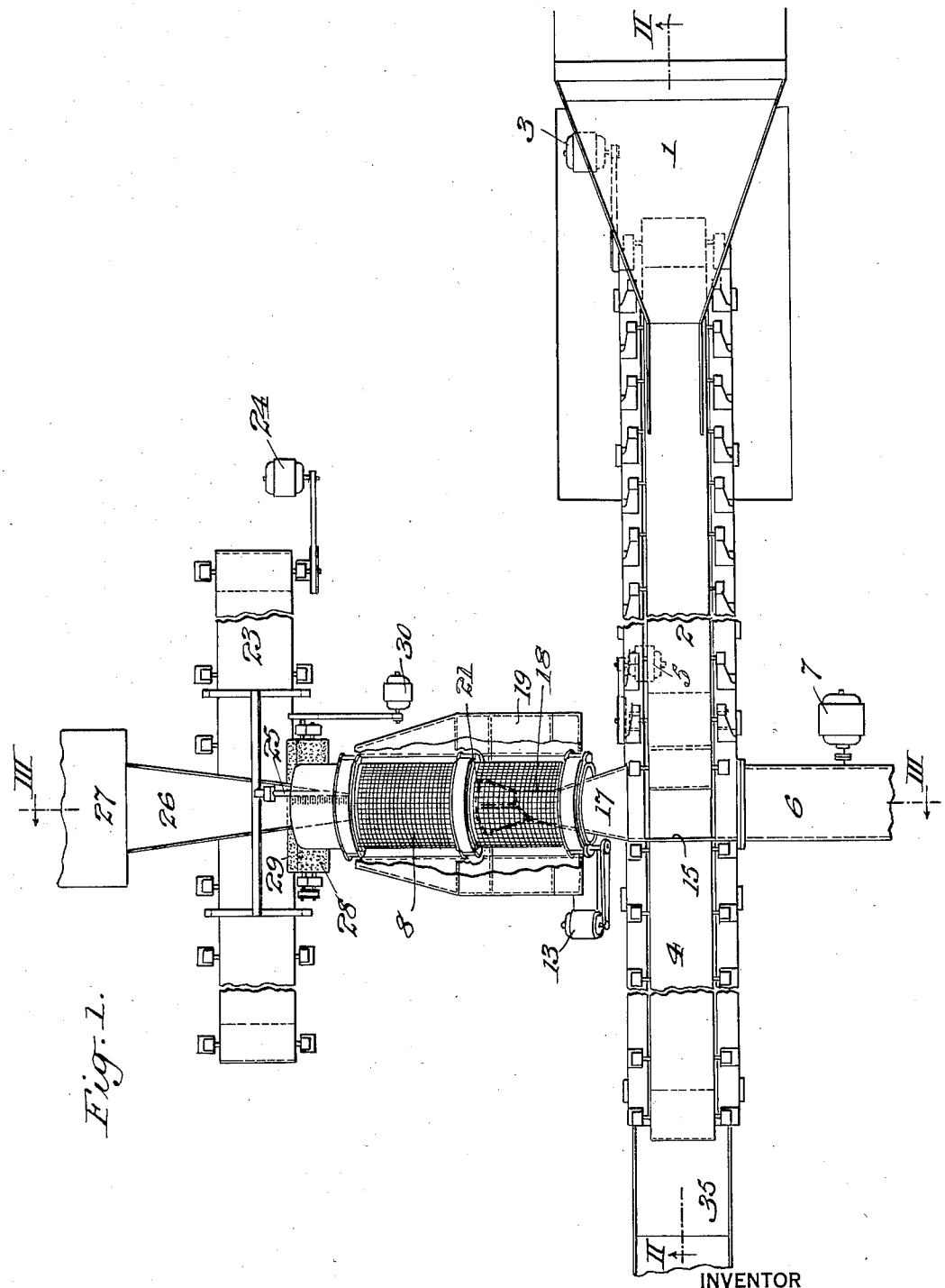
Figure 2:
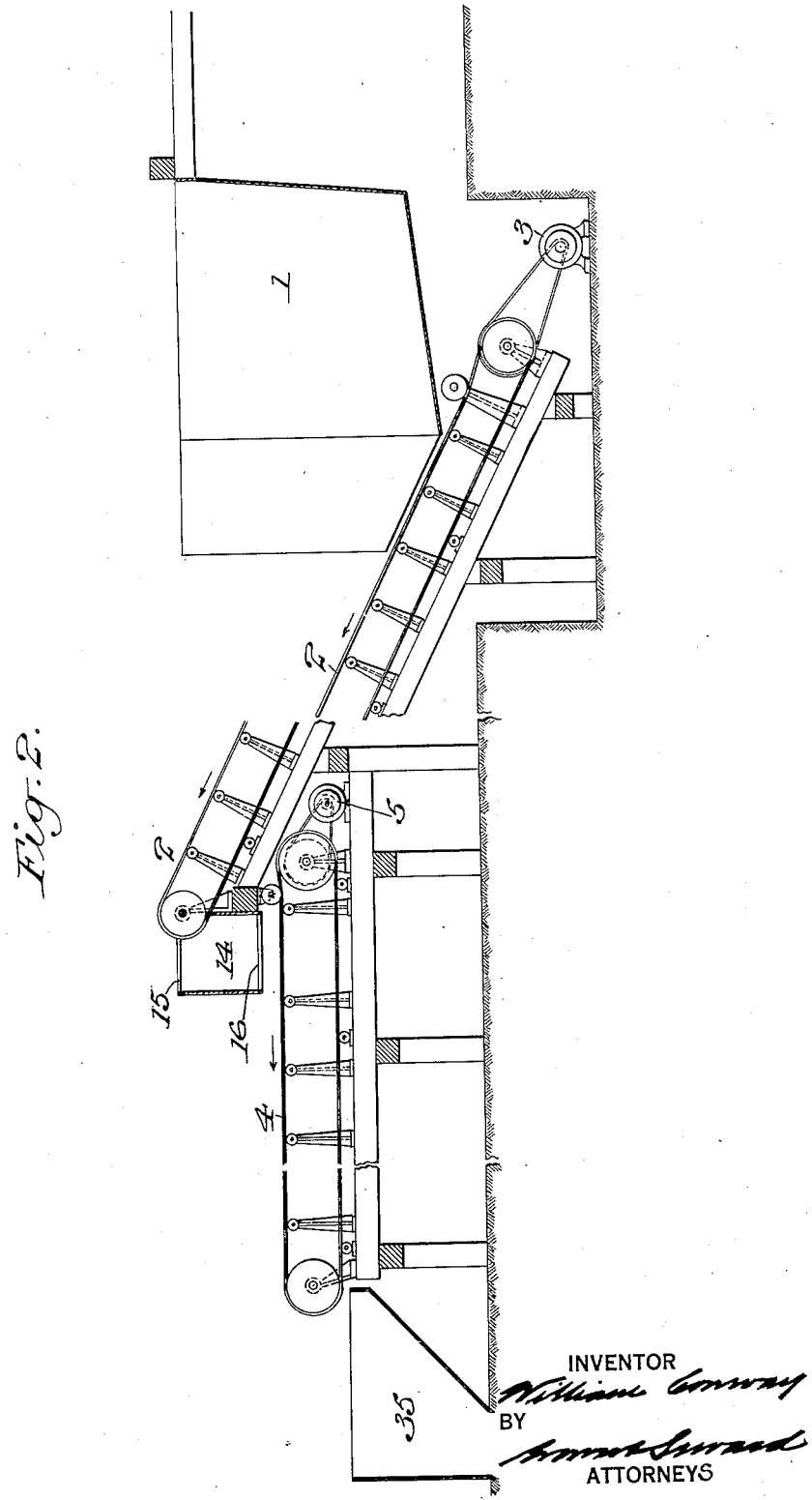
Fig. 2 represents a vertical longitudinal section taken in the plane of the line II—II of Fig. 1, looking in the direction of the arrows.

The bin into which the refuse is dumped from the refuse collecting vehicles is denoted by 1 and the endless conveyor 2 for receiving the refuse from the bin is driven from any desired source of power, as the motor 3. This endless conveyor is shown as inclined upwardly and rearwardly. A second endless conveyor 4 for receiving the heavier materials of the refuse is driven from any suitable source of power, as the motor 5. The receiving end of this endless conveyor 4 is located beneath the delivery end of the endless conveyor 2.

The refuse which is deposited from the bin 1 on to the receiving end of the endless conveyor 2 is carried upwardly and rearwardly thereby to the delivery end of the endless conveyor 2 where the refuse is caused to fall by gravity on to the receiving end of the endless conveyor 4.

As the refuse is falling from one conveyor to the other, the lighter materials are blown from the refuse. In the present instance a rotary blower 6 is provided at one side of the endless conveyors in position to direct a blast of air laterally through the falling refuse, to blow the lighter materials, as paper, cloth, etc. from the heavier materials, the heavier materials being permitted to drop by gravity on to the receiving end of the endless conveyor 4. This rotary blower 6 is driven from any suitable source of power, as the motor 7.

A downwardly and outwardly inclined rotary screen 8 of the required mesh is provided on the opposite side of the endless conveyors from the blower 6 for receiving, separating and removing the lighter materials and for coaction with the blower to remove dust from said lighter materials, which screen is driven from any suitable source of power, as, for instance, by mounting the screen upon sets of rollers 9, 10, carried by shafts 11, 12; one of which shafts, in the present instance, the shaft 12 being driven by the motor 13.

The outlet box 14 for the blower extends across the space between the delivery end of the endless conveyor 2 and the receiving end of the endless conveyor 4, which box has upper and lower openings 15, 16 through which the refuse falls from the conveyor 2 to the conveyor 4. The outer end of this outlet box 14 is provided with a flue 17 projecting into the open inner end of the rotary screen 8, the discharge end 18 of which flue is turned laterally to direct the lighter materials, which are blown from the falling refuse, against the sides of the screen 8 and thus cause the blower to coact with the screen to blow the dust from the lighter materials into a dust box 19 surrounding the screen, which dust box may be provided with a suitable outlet 20 for the dust laden air.

A transversely disposed baffle plate 21 may be located within the rotary screen to prevent the too rapid passage of the lighter materials toward the lower outer open end of the screen.

As the lighter materials reach the lower outer open end of the screen they come into engagement with annular rows of carding needles 22 which are arranged to engage and separate the cloth from the remainder of the lighter materials and thus permit the said remainder to fall from the open outer end of the screen by gravity on to a third endless conveyor 23 driven from any suitable source of power, as the motor 24. A comb 25 projects into the open outer end of the rotary screen 8 into position to strip the cloth from the carding needles 22 and cause the so stripped cloth material to fall by gravity on to the downwardly and outwardly inclined chute 26 and pass down along the same to a suitable delivery table 27.

The remainder of the lighter materials which falls by gravity from the outer end of the rotary screen may be caused to pass by one or more, in the present instance, two, rotary carding brushes 28, 29, driven from any suitable source of power, as a motor 30. These rotary carding brushes serve to remove any cloth from the lighter material as it falls on to the endless conveyor 23 which was not removed by the carding needles 22. Combs 31, 32 are provided for stripping the cloth material from the carding brushes 28, 29 and depositing the cloth material on to the chutes 33 and 34 respectively.

A hopper 35 may be provided in position to receive the heavier materials as they drop off from the discharge end of the endless conveyor 4.

From the above description it will be seen that I have provided an effective means for carrying out my method of sorting refuse to reclaim therefrom the lighter materials, such, for instance, as cloth and paper; also for removing the dust from these lighter materials and for separating these lighter materials.

It is evident that various changes may be resorted to in the construction, form and arrangement of the several parts without departing from the spirit and scope of my invention, and hence I do not wish to be limited to the particular embodiment herein shown and described, but

What I claim is:

1. In a refuse sorting machine, overlapping endless conveyors traveling in the same direction, one of the conveyors being positioned to receive the refuse falling from the other conveyor, an open ended rotary hollow screen located on one side of the conveyors and a blower located on the other side of the conveyors in position to blow the lighter materials laterally from the falling refuse into the screen.

2. In a refuse sorting machine, overlapping endless conveyors traveling in the same direction, one of the conveyors being positioned to receive the refuse falling from the other conveyor, an open ended rotary hollow screen located on one side of the conveyors and a blower located on the other side of the conveyors in position to blow the lighter materials laterally from the falling refuse into the screen, said blower having an outlet box projecting into the screen, through which box the refuse falls from the one to the other of the conveyors.

3. In a refuse sorting machine, overlapping endless conveyors traveling in the same direction, one of the conveyors being positioned to receive the refuse falling from the other conveyor, an open ended rotary hollow screen located on one side of the conveyors and a blower located on the other side of the conveyors in position to blow the lighter materials laterally from the falling refuse into the screen, and a dust box surrounding the screen, said blower having an outlet box provided with a laterally turned flue for directing the lighter materials against the side of the screen for blowing the dust therethrough into the dust box.

4. In a refuse sorting machine, overlapping endless conveyors traveling in the same direction, one of the conveyors being positioned to receive the refuse falling from the other conveyor, an open ended rotary hollow screen located on one side of the conveyors and a blower located on the other side of the conveyors in position to blow the lighted materials laterally from the falling refuse into the screen, and a baffle plate located in the screen to prevent the too rapid passage of the lighter materials to the discharge end of the screen.

5. In a refuse sorting machine, overlapping endless conveyors traveling in the same direction, one of the conveyors being positioned to receive the refuse falling from the other conveyor, an open ended rotary hollow screen located on one side of the conveyors and a blower located on the other side of the conveyors in position to blow the lighter materials laterally from the falling refuse into the screen, and means in the outer end of the rotary screen for separating and removing cloth from the remainder of the lighter materials.

6. In a refuse sorting machine, overlapping endless conveyors traveling in the same direction, one of the conveyors being positioned to receive the refuse falling from the other conveyor, an open ended rotary hollow screen located on one side of the conveyors and a blower located on the other side of the conveyors in position to blow the lighter materials laterally from the falling refuse into the screen, carding needles and a comb being located in the outer end of the rotary screen for separating and removing cloth from the remainder of the lighter materials.

WILLIAM CONWAY.